United States Patent [19]

Burnett et al.

[11] Patent Number: 4,626,009
[45] Date of Patent: Dec. 2, 1986

[54] SHIPPING CONTAINER SEALS

[76] Inventors: Ralph G. Burnett, 7314 Ave., Kenosha, Wis. 53140; Frank Mikic, 3329 99th St., Kenosha, Wis. 53142

[21] Appl. No.: 556,463

[22] Filed: Nov. 30, 1983

[51] Int. Cl.$^4$ ............................................. B65D 33/34
[52] U.S. Cl. ..................................................... 292/327
[58] Field of Search ............... 292/282, 327, 318, 307, 292/320, 325, 316; 70/56, 34

[56] References Cited

U.S. PATENT DOCUMENTS

| 3,769,821 | 11/1973 | Randel | 70/56.X |
| 3,951,443 | 4/1976 | Barnaby | 292/327 |
| 3,975,040 | 8/1976 | Van Gompel | 292/318 |
| 4,204,709 | 5/1980 | Shea | 292/282 X |

FOREIGN PATENT DOCUMENTS 107771  11/1927  Austria ................................. 292/327

Primary Examiner—Richard E. Moore
Attorney, Agent, or Firm—Allegretti, Newitt, Witcoff & McAndrews, Ltd.

[57] ABSTRACT

A seal mechanism for joining two bracket members on a shipping container comprising a male member and a female member cooperating with said male member to prevent retrograde motion once the male member and female member are assembled. The female member includes locking means of different internal diameter cooperating with the male member to permit the male member to move in one direction, but precluding retrograde motion.

7 Claims, 20 Drawing Figures

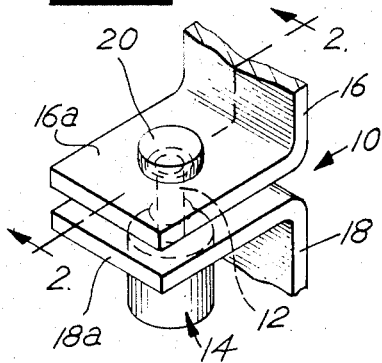
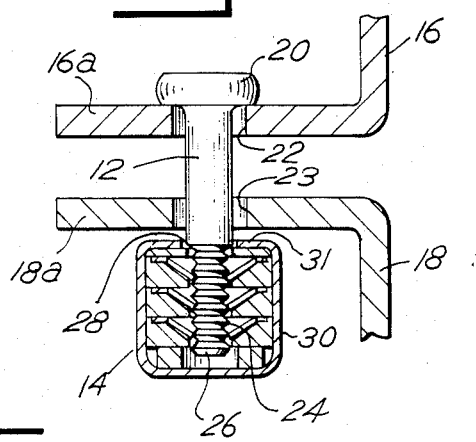
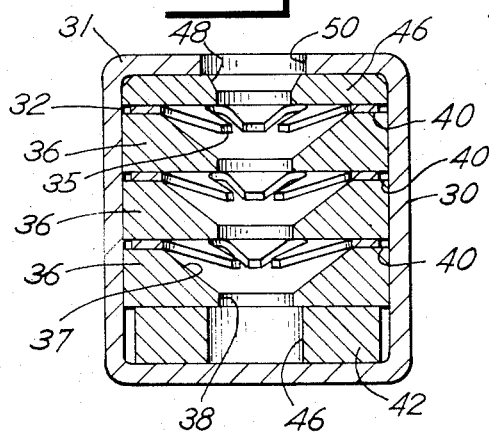
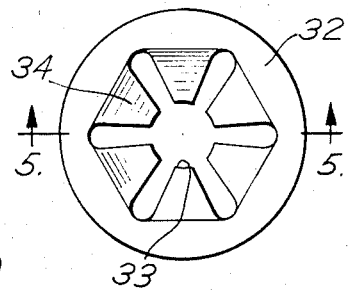
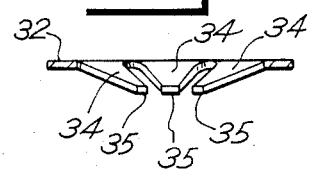
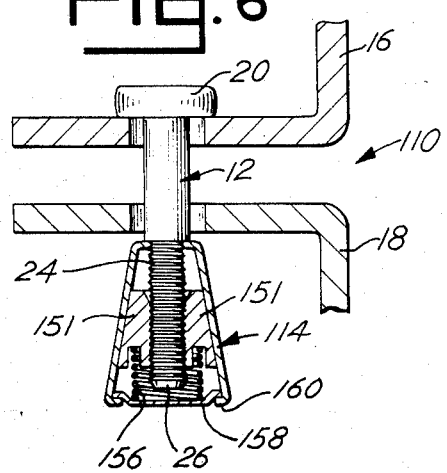
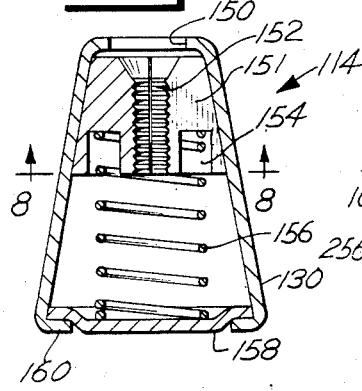
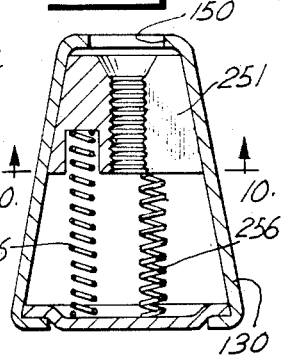
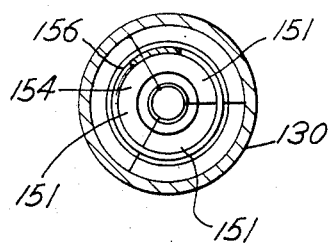
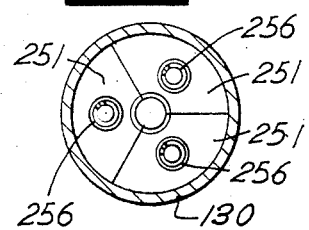

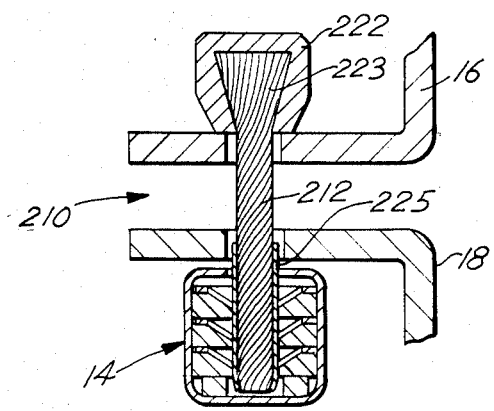
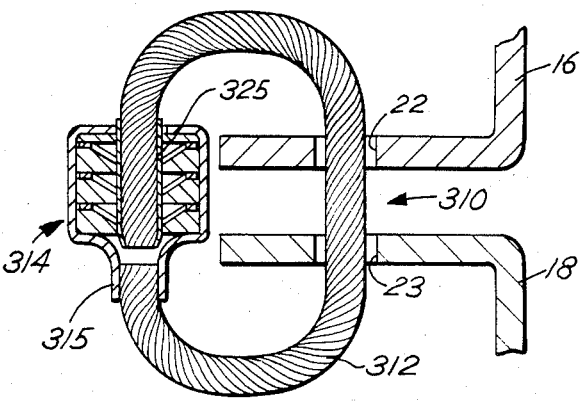
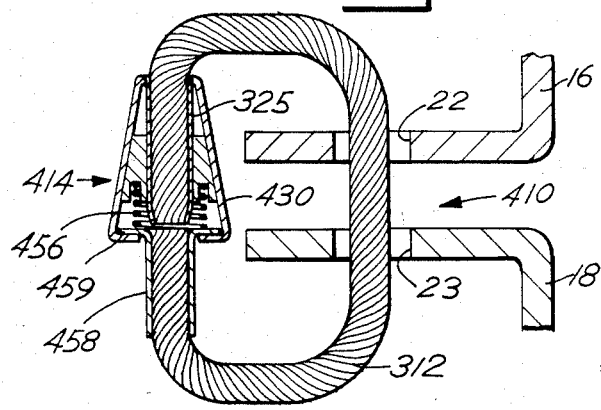
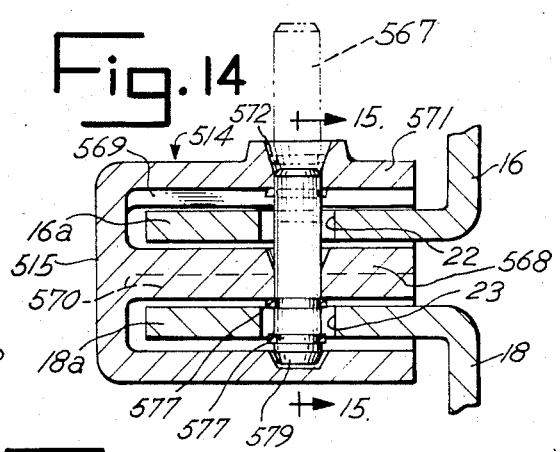
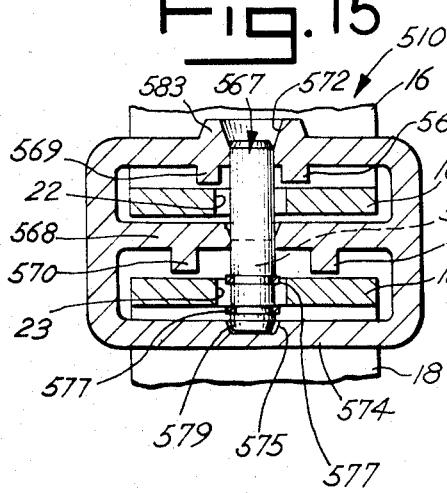
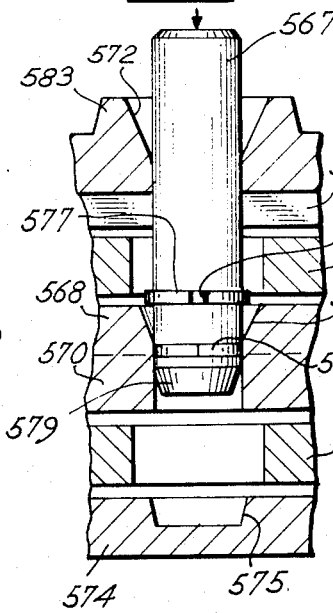
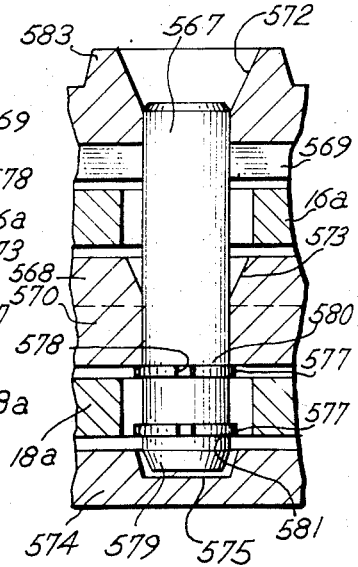

SHIPPING CONTAINER SEALS

In one form of female member, a plurality of washers having inward projections defining a hole are provided. The inward projections cooperate with the exterior surface of the male member to preclude retrograde motion. Circumferential serrations may be provided on the exterior surface of the male member to enhance the locking relationship.

In another form of female member, biased wedges contained within a tapered housing are provided. The inner surfaces of the wedges which define an opening or hole for the male member may be ribbed to enhance engagement with the plain or serrated exterior surface of the male member.

In yet another form of seal mechanism, the male member is comprised of a segment of wire rope, rather than a rod or pin, with a head formed at one end and a sleeve affixed at the other end. If desired, an elongated segment of wire rope can be used, with the female member affixed at one end and the male member formed at the other end.

In still another embodiment, the male member is formed as a pin, with spaced apart expandable rings carried thereon, and the female member is a box-like hood having an internal shelf. The brackets may be received in the hood one at each side of the internal shelf or both brackets between the internal shelf and the hood. Aligned holes in the roof and internal shelf of the hood align with the holes in the brackets. The holes in the hood have chamfered entry surfaces to squeeze the rings to permit passage through the holes. Initially, a pin is required in the hole in the roof of the hood, with the expandable rings one on either side of the roof. After assembly, an expandable ring abuts the underside of the internal shelf. The pin is entirely within the hood and is inaccessible to tampering.

BACKGROUND OF THE INVENTION

This invention relates to a seal mechanism, and more particularly, to a seal mechanism for securely fastening the doors of a maritime shipping container.

Maritime shipping containers for containerized shipping have been increasingly popular for the shipping of products and materials overseas. A maritime shipping container is essentially the same as a semi-trailer, but without wheels. The doors of the container, which allow access to the interior of the container, are essentially the same as the doors of a semi-trailer.

Brackets are provided on the doors of the maritime shipping containers for receiving sealing devices to seal the container against unauthorized entry. Theft of the contents is a problem with maritime shipping containers, which often sit unprotected in isolated areas.

A known sealing mechanism comprises a male member which is adapted to be inserted through aligned openings in the brackets into a female member which is secured to the male member. Such sealing mechanism is relatively expensive to manufacture for it basically consists of five parts which must be separately made, machined, and assembled. The female member particularly requires considerable machining.

Another disadvantage of the prior sealing mechanism is that it can be simply altered so as to allow insider theft by employees. For example, the tip of the male member could be ground or otherwise machined to remove a small amount of material and then the tip could be polished to conceal the alteration. The prior art sealing mechanism could then be assembled in its intended manner, but a vigorous tug on the female member relative to the male member would cause the male member to slip out.

A further disadvantage of the prior art sealing mechanism is that it cannot easily accommodate misalignment of the brackets. If a door sags, for example, the holes in the brackets which receive the sealing mechanism become misaligned. The cylindrical sealing member cannot be inserted through greatly misaligned holes in the brackets to seal the doors of the container and could be inserted through slightly misaligned or offset holes only with difficulty.

In pending application Ser. No. 477,772 filed Mar. 22, 1983, by Ralph Burnett there is disclosed a seal mechanism which includes a curved male member formed from segments defining tooth means on the exterior thereof, said male member cooperating with a complementary curved female member having an insert for receiving the male member and preventing retrograde motion of the male member relative to the female member after insertion therein. While the Burnett seal mechanism shown in application Ser. No. 477,772 is an improvement over the known prior art, further refinements were conceived to reduce manufacturing costs and to additionally enhance performance of the seal mechanism.

An object of the present invention is to provide an improved seal mechanism including locking means of different internal diameter cooperating with the male member to permit the male member to move in one direction relative to the female member, but precluding retrograde movement of the male member relative to the female member.

Another object of the present invention is to provide an improved seal mechanism wherein the female member comprises a plurality of washer-like elements having different internal members for cooperative engagement with the male member.

Yet another object of the present invention is to provide an improved seal mechanism having locking means secured to the male member for securing the male member in place, the male member being constructed and arranged so as to be tamper proof when in assembled relationship with brackets to be fastened.

Still another object of the present invention is to provide a seal mechanism which includes a pin-like male member having thereon resilient retaining rings spaced apart axially and a hood-like female member having holes for receiving the male member and an internal wall member cooperating with the male member so as to preclude retrograde motion of the male member relative to the female member. Other objects and advantages will be made more apparent hereinafter.

BRIEF DESCRIPTION OF THE DRAWINGS

There is shown in the attached drawing presently preferred embodiments of the present invention, wherein like numerals in the various views refer to like elements and wherein:

FIG. 1 is a perspective view of a seal mechanism shown in use in the brackets of the door of a shipping container;

FIG. 2 is a cross-sectional view of the seal mechanism of FIG. 1 taken generally along line 2—2 of FIG. 1, with the male and female parts shown assembled on the brackets of a shipping container;

3

FIG. 3 is a cross-sectional view of the female member of the seal mechanism of FIG. 1;

FIG. 4 is a plan view of a washer member of the seal mechanism of FIGS. 1-3;

FIG. 5 is a cross-sectional view of a washer member taken along the line 5—5 of FIG. 4;

FIG. 6 is a cross-sectional view illustrating a modified seal mechanism;

FIG. 7 is an enlarged cross-sectional view of the female member of the seal mechanism of FIG. 6, with the spring shown in position prior to entry of the male member;

FIG. 8 is a cross-sectional view of the female member shown in FIG. 7, taken generally along the line 8—8 of FIG. 7;

FIG. 9 is a cross-sectional view similar to FIG. 7 illustrating another female member;

FIG. 10 is a cross-sectional view of female member of FIG. 9, taken generally along the lines 10—10 of FIG. 9;

FIG. 11 is a cross-sectional view of a seal modification, similar to FIG. 2, showing a different form of male member;

FIG. 12 is a cross-sectional view of a seal mechanism comprising a unitary male member and female member, with the female member being similar to that of FIGS. 2 and 3;

FIG. 13 is a cross-sectional view of a seal mechanism similar to FIG. 12, with the female member being similar to that of FIGS. 6-8;

FIG. 14 is a cross-sectional view of a further modified seal mechanism.

Figure 18:
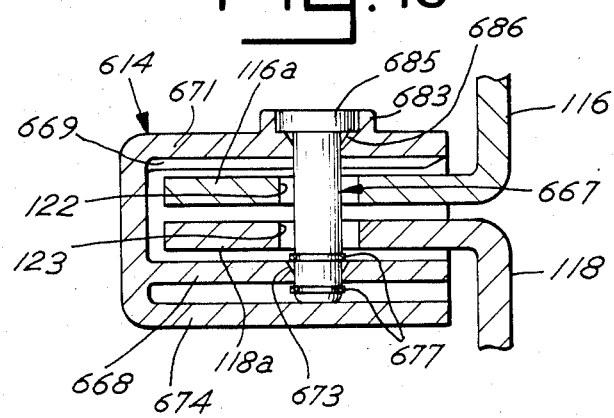
Figure 19:
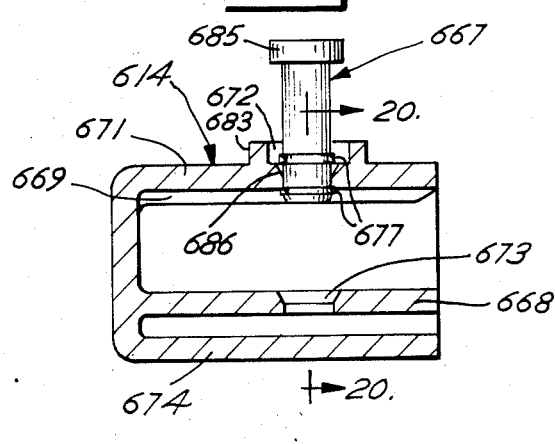
Figure 20:
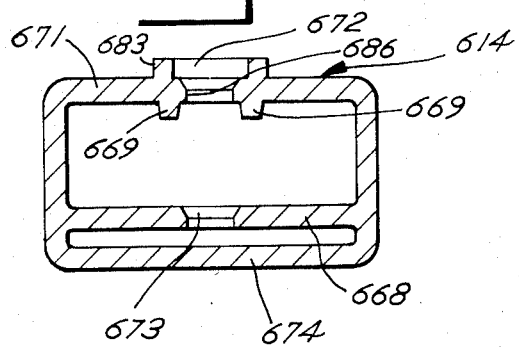

FIG. 15 is a cross-sectional view of the modified seal mechanism of FIG. 14 taken generally along line 15—15 of FIG. 14;

FIG. 16 is an enlarged cross-sectional view illustrating the assembly of the seal mechanism of FIG. 14; and FIG. 17 is an enlarged cross-sectional view of the seal mechanism of FIG. 14, illustrating the fully assembled position of the male member;

FIG. 18 is a cross-sectional view of another modification of seal mechanism, similar to FIG. 14;

FIG. 19 is a cross-sectional view of the modified seal mechanism of FIG. 18, prior to assembly to shipping container brackets; and FIG. 20 is a cross-sectional view of the hood of the modified seal mechanism taken generally along line 20—20 of FIG. 19.

DETAILED DESCRIPTION OF THE INVENTION

A first embodiment of the present invention is shown in FIGS. 1-5. The seal mechanism 10 comprises a male member 12, and a female receptacle 14 adapted to secure in assembled relationship the brackets 16, 18 of a maritime shipping container.

The male member 12, as shown in FIGS. 1 and 2, comprises a metal shaft or stud having an enlargement or a head 20 at one end, which is larger than the hole 22 in the bracket 16. The cylindrical head 20 has rounded edges. The lower one-half of the stud 12 is of smaller diameter than the upper one-half. Moreover, the lower one-half of the stud 12 has circumferential serrations 24, which are generally circular and form tooth-like non-spiral projections and depression axially of the male member 12. The stud 12 also has a conical tip 26 and in its mid portion a shoulder 28 where the smaller diameter of the lower one-half meets the larger diameter of the upper one-half.

The female member 14 comprises an outer steel capsule 30 containing a series of one or more push-nut spring washer 32.

Each push-nut spring washer 32 has a central circular hole 33. As seen in FIG. 3, the central circular holes 33 decrease in size from the uppermost to the lowermost. It is unimportant whether the central circular holes 33 decrease in size from the uppermost to the lowermost or increase in size from the uppermost to the lowermost or are mixed in size from the uppermost to the lowermost. What is important, is that they are different in size. If they are different in size, the difference in size of the central circular holes 33 will serve as a method of deception for a potential thief.

Each push-nut spring washer 32 has a series of six triangular-shaped inward projections 34. Each triangular-shaped inward projection 34 has a sharp termination 35. Moreover, the triangular-shaped inward projections 34 are downwardly deflected from a transverse plane through each washer 32, as seen in FIG. 5, to enhance gripping engagement with the exterior surface of the male member 12.

Below each push-nut spring washer 32 is a cylindrical spacer 36 (FIG. 3). The three spacers 36 are all the same. Each spacer 36 has a conical beveled upper surface 37, which beveled surface 37 allows space for further downward deflection of the triangular-shaped inward projections 34 of the push-nut spring washer 32. The conical beveled surface 37 also, because of its shape, acts as a stop to prevent deformation of the push-nut spring washers 32 if, after assembly of the seal mechanism, severe sideward pressure is applied to the female member 14. As seen in FIG. 3, there is also a slight space 40 around the outside of the outer circumference of each push-nut spring washer 32. Space 40 allows slight play, which in turn allows motion and conformity of the push-nut spring washers 32 if severe sideward pressure is applied to the female receptacle 14 after the assembly of the seal mechanism. Moreover, the space 40 allows clearance for the sideward movement of the push-nut spring washer 32, which sideward movement must occur in the presence of severe sideward pressure upon the female receptacle 14 after assembly of the seal mechanism. Each spacer 36 also contains a central cylindrical hole 38 which is slightly larger than the diameter of the lower one-half of the stud 12. The hole 38 will be allowed to absorb the sideward force applied to the female member 14 in the presence of severe sideward pressure after the assembly of the seal mechanism 12.

The female member 14 also contains a spacer 42 which is cylindrical and has a central cylindrical hole 44 for the reception of the tip 26 of the male member or stud 12. Additionally, there is an uppermost spacer 46 which is cylindrical in shape. The uppermost spacer 46 contains a central cylindrical hole 48, which central cylindrical hole 48 is of a shape necessary to fit the shoulder 28 of the stud 12.

Initially, the housing 30 is cup-shaped, with an open top. After the contents have been placed within the housing 30 of the female member 14, the upper portion 31 of the housing 30 is bent centrally so as to close the female member. This closing action results in the formation of a hole 50 in the roof of the female member 14, which roof is now formed by the upper portion 31 of the housing 30. The hole 50 is of sufficient diameter to admit the largest diameter of the upper one-half of the stud 12.

In the assembly process of the seal mechanism of FIGS. 1–5, the stud 12 is inserted through the holes 22, 23 in the parallel portions 16a and 18a of the brackets 16 and 18 of the doors of a shipping container. The female member 14 is then placed so that the hole 50 in its roof is over and aligned with the tip 26 of the stud 12. The female member 14 is then manually pushed upward until the shoulder 28 of the stud 12 is seated in the hole 48 of the uppermost spacer 46 of the female member 14.

During the assembly process, the triangular-shaped inward projections 34 of the push-nut spring washers 32 are deflected downward so as to allow passage of the tip and lower one-half of the stud 12 until the tip 26 is seated in the hole 44 of the spacer 42. Because the central circular holes 33 of the push-nut spring washers 32 are not equal in diameter, the triangular-shaped inward projections 34 of each push-nut spring washer 32 will be deflected at different angles. The sharp terminations 35 of the triangular-shaped inward projections 34 will now dig into and seat themselves in the metal of the lower one-half of the stud 12, prohibiting retrograde motion of the male member 12 relative to the female member 14 and prohibiting removal of the female member 14. The circumferential serrations 24 of the lower one-half of the stud 12 are camouflage. The sharp terminations 35 of the triangular-shaped inward projections 34 will dig into the metal of the stud 12, even if the serrations 24 are ground away. Moreover, if a potential thief were to grind away the metal from the lower one-half of the stud 12, the amount of metal that he would have to grind away would be a function of the diameter of the central circular hole 33 in each push-nut spring washer 32. Because those central circular holes 33 are different in each push-nut spring washer 32, it will be very difficult for a thief to determine how much metal he must grind away from the lower one-half to the stud 12. Even one push-nut spring washer 32 is capable of preventing removal of the female member 14.

A potential thief who might be tempted to grind away the metal from the lower one-half of stud 12 would not be able to effectuate disassembly of the seal mechanism because the different diameters of the central circular holes 33 in the washer 32 would cooperate with the exterior surface of the stud 12 so as to prevent retrograde motion of the stud or male member 12 relative to the female member 14.

With reference to FIGS. 6, 7 and 8, there is illustrated a modified seal mechanism 110 which utilizes the same stud 12 as is utilized in the embodiment of FIGS. 1–5 and a modified female member. The female member 114 includes a generally conical housing 130. Housing 130 contains a cylindrical hole 150 in its upper end. The cylindrical hole or entry opening 150 is slightly larger than the smallest outside diameter of the stud 12.

The conical housing 130 contains two or more wedges 151 within its internal cavity. Preferably, three wedges 151 are used. Each wedge 151 is a segment of a cone. Along its inner surface each wedge 151 contains sharp teeth 152. In its base, each wedge 151 contains a slot 154. The slots 154 provide a space for a spiral spring 156.

After the wedges 151 and the spiral spring 156 have been placed inside of the conical housing 130 through the large open end, a cylindrical plate 158 is placed in the large opening end of the conical housing 130. Thereafter, the portion 160 of the side walls of the conical housing 130 near the base thereof is bent inward so as to close the lower end of housing 130 and to entrap and retain the contents of the conical housing 130. The spring 156 will bias the wedges 151 upward toward the apex of the conical housing 130 and toward the entry opening 150 for the male member 12 into the female member 114.

To utilize the seal mechanism 110 the stud 12 is inserted into the brackets 16, 18. The conical female member 114 is manually placed so as the hole 150 accepts the tip 26 of the stud 12. The housing 130 is pushed upward over the lower portion of stud 12 until the roof of the housing 130 strikes the shoulder 28 of the stud 12. As the housing 130 is pushed upward over the lower half of the lower portion of the stud 12, the wedges 151 are forced downward and outward against the resistance of the spiral spring 156.

FIG. 7 shows the wedges 151 in the upper part of the housing 130. Any downward pull upon the housing 130 will result in the sharp teeth 152 on the inner surface of wedges 151 embedding themselves into the metal of the exterior surface of the lower portion of stud 12. Moreover, the wedging action of the wedges 151 will result in greater embedding of the teeth 152 into the stud 12, as the downward force is increased. A great deal of metal will have to be grounded away from the lower one-half of the stud 12 by a potential thief to prohibit this wedging and retaining action.

The circumferential serrations 24 on the stud 12 are not necessary for the retaining action of the wedges 151. They enhance the locking action of the female member 114 relative to the male member 12. The teeth 152 on the inside surface of the wedges 151 are self locking. The more force that is applied downward on the housing 130, the greater the locking action of the wedges 151 and their teeth 152 on the stud 12.

Turning to FIGS. 9 and 10, there is shown a modified female member which differs from the embodiment of FIGS. 6, 7 and 8 only in the spring means. The spring means 256 in the embodiment of FIGS. 9 and 10 comprise separate members, one for each wedge 251. In other respects, the female member is the same as that of FIGS. 6, 7 and 8 and accordingly, further explanation is believed to be unnecessary.

Turning to FIG. 11, there is shown a seal mechanism like that of FIG. 2, except that an alternative stud or male member is used. The seal mechanism 210 of FIG. 11 includes a male member 212 which is comprised of a segment of wire rope. The upper end of the wire rope 212 is widened to conical shape and filled with molten metal between the strands of the wire rope 212. A steel cap 222 is then crimped onto the conical-shaped enlargement 223. A steel sleeve 225 is crimped onto the lower end of wire rope 212. The female member 14 cooperates with the stud or male member 212 in the same fashion as explained heretofore with respect to the embodiment of FIGS. 1, 2 and 3.

Turning to FIG. 12, there is shown a seal mechanism 310 manufactured as a single piece. At the tip of an elongated segment of the twisted wire rope 312, a steel sleeve 325 is crimped. A female receptacle 314, which is essentially the same as the female receptacle 14 in FIG. 11, is applied to the opposite end of the long segment of twisted wire rope 312 by means of the portion 315. The portion 315 affords a means by which the female receptacle 314 may be crimped onto the end of the elongated segment of twisted wire rope 312.

As seen in FIG. 12, the twisted wire rope segment 312 is inserted through the holes 22, 23 in the brackets 16, 18 of the maritime shipping container, then bent upon itself and the steel sleeve 325 at the tip is inserted into the female receptacle 314. The locking and sealing mechanisms remain unchanged from FIG. 11, for example. The primary advantage of the mechanism of FIG. 12 is that it is made as a unitary member.

The seal mechanism of FIG. 12 can be adapted to receive a female receptacle like that of FIG. 7, as is shown in FIG. 13. The female receptacle 414 is essentially the same as the female receptacle 114 in FIG. 7. The contents of the female receptacle 414 are also equivalent to the contents of the female receptacle 114 in FIG. 7. The principal difference in the female receptacle 414 from the female receptacle 114 is the connecting section 458. Section 458 is secured within housing 430 and is crimped onto one end of the elongated segment of twisted wire rope 312. Additionally, the section 458 includes an outwardly flared flange 459 which is secured within the housing 430 and allows for closure of the open end of the female receptacle 414 and its conical housing 430.

In FIGS. 14-17, there is shown still another embodiment 510 of seal mechanism of the present invention. The female receptacle 514 is in the form of a hood, which comprises a metal box-like structure with five sides and an open side for receiving the parallel members 16a and 18a of the brackets 16 and 18 of the maritime shipping container.

The hood 514 contains an inner horizontal shelf 568. The roof 571 of the hood 514 contains two ribs 569 incorporated into the metal of the inner surface of the roof 571. The ribs 569 extend from the open side of the hood of female receptacle 514 to the front wall 515. The inner horizontal shelf 568 contains three ribs 570 incorporated into the metal of the lower surface of the inner horizontal shelf 568. The ribs 570 extend from the open side of the hood to the front wall 515. The central rib 570 has an opening or hole 573 therethrough for receiving the pin or stud 567. The inner horizontal shelf 568 is spaced from the top and bottom of the hood so as to receive the parallel portions of adjacent brackets 16, 18.

The non-removable stud or pin 567 consists of a section of a metal rod 582. The lower end of rod 582 is formed with conical tip 579. Near its lower end, two circumferential recesses 580 and 581 are formed in the metal of the non-removable pin 567. Those circumferential recesses 580 and 581 are formed to receive two circumferential split rings 577. Each circumferential ring 577 is formed so as to contain a gap 578 between the ends of the metal of the ring 577. The rings 577 are not round, but rather square or rectangular in their cross sectional shape. This square or rectangular shape is chosen because it is much more difficult to remove than a ring of round cross sectional shape when the seal mechanism has been assembled.

An important aspect of seal mechanism 510 is that in the manufacturing process, the non-removable pin 567 is partially assembled before delivery of the seal to the customer (see FIG. 14). As shown in dotted line position, the non-removable pin 567 is forced into the chamfered hole 572 only so far that the lowermost circumferential ring 577 passes through the chamfered hole 572 in the roof 571. The lower ring 577 is between the ribs 569, and hence protected from tampering before assembly. Moreover, the hood is designed so that the uppermost circumferential ring 577 lies within the upper portion of the chamfered hole 572 and is inaccessible to tampering. The roof 571 has a circumferential raised portion 583 surrounding the chamfered hole 572 which further prevents tampering with the circumferential ring 577. The non-removable pin 567 is now permanently in place and cannot be removed because the lowermost ring 577 has passed through the chamfered hole 572 and prohibits removal of the non-removable pin 567.

Any force inward upon the non-removable pin 567 will cause the uppermost circumferential ring 577 to pass through the chamfered hole 572, which will prohibit the removal of the non-removable pin 567, and moreover, will destroy the usefulness of the seal. The ribs 569 and 570 are intended to further prevent any tampering with the seal.

In the assembly process (see FIGS. 14-17), the hood 514 with the non-removable pin 567 lying within the chamfered hole 572 is placed over the parallel portions 16a and 18a of the brackets 16 and 18 of the maritime shipping container. The inner horizontal shelf 568 lies between the two parallel portions 16a and 18a. The non-removable pin 567 is now forced downward through hole 22, 23, respectively, in the parallel portions 16a and 18a respectively, and through the chamfered hole 573 in the inner horizontal shelf 568. As the split rings 577 pass through hole 573, they are compressed (see lower ring FIG. 16). Once the circumferential rings 577 have passed through the chamfered holes 572 and 573, the split rings expand (see FIG. 17), and the non-removable pin 567 is permanently in place and cannot be removed. The lower end 579 of pin 567 is in the chamfered recess 575. The pin 567 is of a length that the top thereof is substantially flush with the top of raised portion 583 when in assembled position. The top of pin 567 may be provided with an embossed mark which would be visible when the pin 567 were seated in hood 514. This should frustrate someone from cutting the top of the pin 567 in order to render the seal mechanism inoperative and subject to misuse.

Removal of the seal mechanism should require a cutting tool or a cutting torch. After fabrication of the hood 514 of the female receptacle, it can be heat treated or case hardened to a desired depth in order to frustrate sawing or mechanical cutting of the hood.

The embodiment of FIGS. 18-20 is similar to the embodiment of FIGS. 14-17, but basically it has been designed to accommodate shipping container brackets that are more closely spaced together than the brackets 16, 18 of the embodiments illustrated in FIGS. 1-17. The close positioning of the parallel portions 116a and 118a of brackets 116 and 118 prohibits the placement of an inner horizontal shelf of the hood 514 between them. Accordingly, the seal mechanism of 510 was redesigned to accommodate close positioning of the parallel portions 116a and 118a.

The hood 614 (FIGS. 18-20) is formed with an inner horizontal shelf 668 that is spaced further from the roof 671 than the shelf 568 (FIGS. 14 and 15) is spaced from the roof 571. The parallel portions 116a, 118a of the brackets 116, 118 can be accommodated between the top of the inner horizontal shelf 668 and the roof 671.

There are no ribs projecting from the bottom of the inner shelf 668 in the embodiment of FIGS. 18-20. The chamfered recess in the bottom of hood 514 has been omitted from the embodiment of FIGS. 18-20.

The pin 667 of FIGS. 18 and 19 includes circumferential expandable split rings 677, as in the embodiment of FIGS. 14-17, however, the lowermost ring 677 engages the bottom of inner shelf 668 to prohibit removal of the non-removable pin 667. The pin 667 is provided with a head 685, which is adapted to seat within a complementary recess of hole 672 in the raised portion 683 in the top 671 of hood 614. The top of the head 685 is flush or below the top of the raised portion 683. Preferably, head 685 and the recess of hole 672 are cylindrical. The purpose of forming the head 685 and recess of the hole 672 in this manner is to cause additional difficulty to removal of the seal mechanism 610 from brackets 116, 118 by an unauthorized person.

The seal mechanism 610 is used in substantially the same fashion as the seal mechanism 510. Pin 667 is initially assembled to hood 614 as shown in FIG. 19, with the lower end of pin 667 extending through hole 672 in the top 671 of hood 614. the lower ring 677 is below the top wall 671, and the pin 667 cannot be pulled outwardly from the hood 614. Ribs 669 projecting from the top wall 671 protect the lower ring 677 from tampering.

For assembly of seal mechanism 610 to maritime shipping container brackets, the hood 614 of FIG. 19 is slipped over parallel portions 116a and 118a. Pin 667 is pushed through the holes 122, 123 in the parallel portions 116a, 118a of the brackets 116 and 118 and through hole 673 in inner shelf 668 until the head 685 of pin 667 is flush with the raised part 683. The lower split ring 677 is compressed as it passes through hole 673. Once the lower split ring 677 clears hole 673, it will expand. The lower split ring 677 is engaged below the inner shelf 668 to prevent retrograde motion of the pin or male member 667 from the hood or female member 614.

There has been provided by the present invention improved seal assemblies that are tamperproof, are strong, and are relatively inexpensive.

While we have shown and described presently preferred embodiments of the present invention, it will be understood that the invention may be otherwise embodied within the scope of the appended claims.

We claim:

1. A seal mechanism for joining two bracket members having holes therein comprising a male member means and a female member means cooperating with said male member means to prevent retrograde motion once said male member means and female member means are assembled on said two bracket members, said female member means including locking means cooperating with said male member means to permit the male member means to move in one direction, but precluding retrograde motion, said female member means comprising a box-like hood formed with an inner horizontal shelf having a hole therein and having an open side for receiving said bracket members, said hood having aligned holes in the roof and the inner horizontal shelf, adapted to be aligned with the holes in the bracket members, said male member means comprising a pin having an expandable ring carried thereon, said pin being adapted to extend through the holes in the bracket members and the aligned hole in the roof into the hole in said inner horizontal shelf to secure the bracket members within the box-like hood.

2. A seal mechanism as in claim 1 wherein the male member means comprises a pin having a pair of expandable rings carried in spaced apart recesses adjacent an end of the pin.

3. A seal mechanism as in claim 2 wherein the pin is initially retained to the roof of the hood, with the expandable rings one on either side of said roof and after assembly, an expandable ring engages with the underside of the inner shelf.

4. A seal mechanism as in claim 2 wherein the holes in the roof and inner shelf of the hood each have chamfered entry surfaces, whereby the expandable rings may be squeezed to permit passage through the holes and then expanded after passage through the holes.

5. A seal mechanism as in claim 4 wherein the expandable rings are noncircular in cross section.

6. A seal mechanism as in claim 4 wherein ribs are provided on the inner surface of the roof to inhibit tampering with the seal mechanism in use.

7. A seal mechanism as in claim 6 including a plurality of ribs on the lower surface of the inner shelf to inhibit tampering with the seal mechanism in use.

* * * * *